March 9, 1954 S. H. BUTOW 2,671,227
MOISTURE COLLECTOR FOR FLUSH TANKS
Filed July 28, 1948
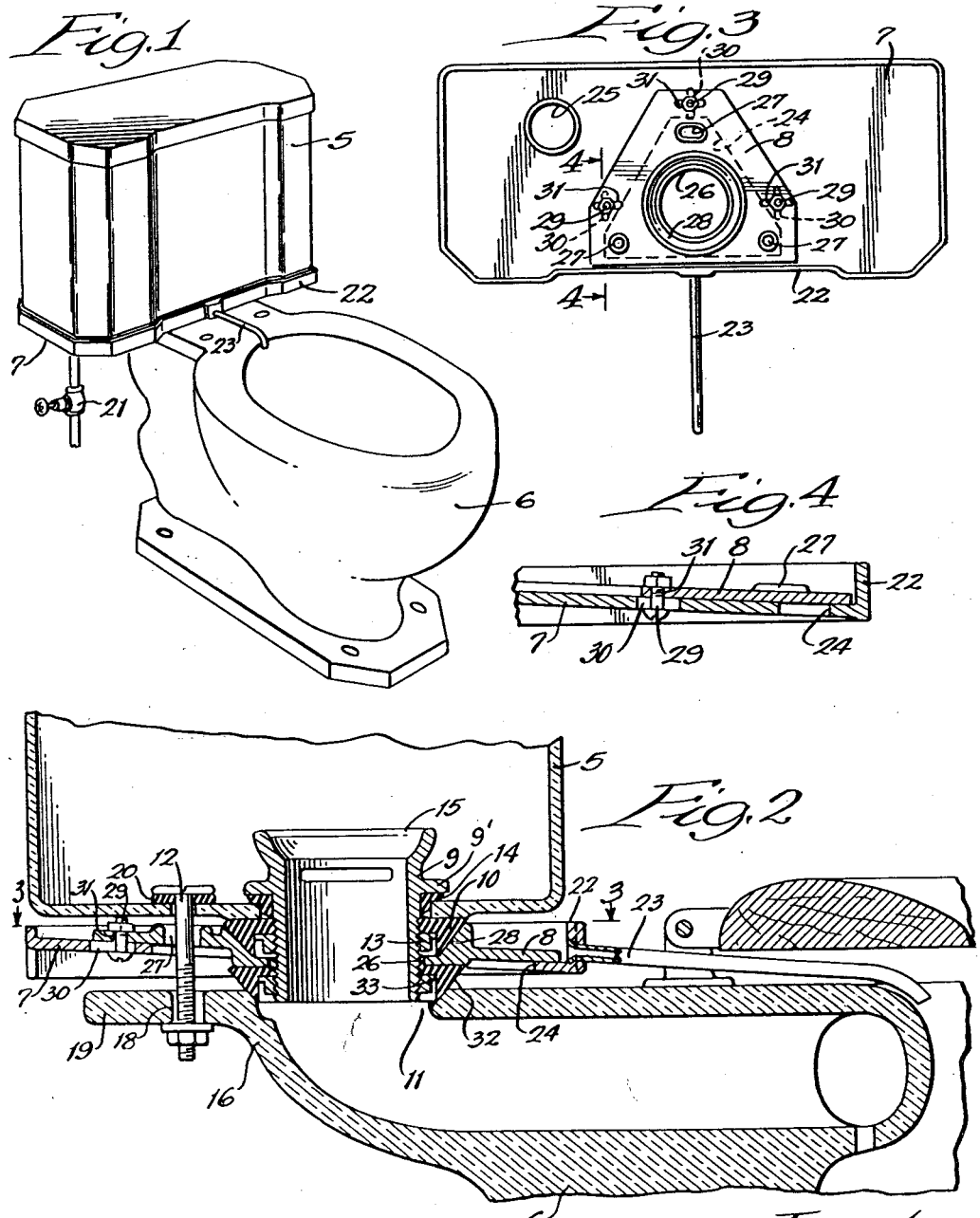
Inventor:
Stanley H. Butow,
By Soans Pond & Anderson
Attorneys.

Patented Mar. 9, 1954

2,671,227

UNITED STATES PATENT OFFICE 2,671,227

MOISTURE COLLECTOR FOR FLUSH TANKS

Stanley H. Butow, Wilmette, Ill.

Application July 28, 1948, Serial No. 41,093

6 Claims. (Cl. 4—252)

One of the annoyances encountered in modern bathrooms and toilets, where the air is warm and fairly humid, is the drip onto the floor of the condensate which collects on the exterior surface of a frequently-flushed toilet tank. In certain areas, during the summer months particularly, this annoyance is very acute. Where such an annoyance occurs, frequent mopping up of the moisture is required in order to avoid the risk of deterioration of floors or floor coverings.

The main objects of this invention, therefore, are to provide an improved form of device for collecting and draining off the condensate formed on the exterior wall of a frequently-flushed tank located in a warm, humid room; to provide an improved moisture collector particularly adapted for positioning between the tank and bowl of a "coupled" type of toilet; to provide an improved mounting means for a moisture collector of this kind to permit adjustment on the tank so that the perimeter of the collector approximates the general contour of the tank and constitutes an effective but not conspicuous or unattractive accessory to the tank; and to provide a device of this kind which is most economical to manufacture, very easy to install, and highly effective in function.

In the drawings,

Fig. 1 is a perspective view of a tank and bowl of a toilet, of the type known as "coupled," wherein the tank is mounted directly on the bowl and attached thereto, and wherewith has been arranged an improved form of moisture collector embodying this invention;

Fig. 2 is an enlarged, fragmentary, cross-sectional detail of the assembly shown in Fig. 1;

Fig. 3 is a plan view of the preferred form of improved moisture collector embodying this invention as viewed from the plane of the line 3—3 of Fig. 2; and Fig. 4 is an enlarged fragmentary cross-sectional detail taken on the line 4—4 of Fig. 3.

The toilet, for which the herein-shown improved form of moisture collector embodying this invention is designed for use, comprises a flush tank 5 which as produced by the manufacturer rests directly upon and is coupled to a bowl 6. The preferred embodiment of a moisture collector, for assembly with that type of toilet, comprises a flanged plate or pan 7 adjustably supported on a bracket 8 whereby the plate 7 is mounted intermediate the tank 5 and bowl 6 with the flanged perimeter of the plate 7 in approximate alinement with the exterior vertical walls of the tank 5.

As produced by the manufacturer the tank 5 is provided with an outlet fitting 9, whereon is mounted a gasket 10, which seats and seals the tank 5 on an opening 11 in the bowl 6, the tank and bowl being anchored against displacement by bolts 12. The coupling 9 is clamped to the bottom of the tank 5 by a nut 13 threaded onto the fitting 9 with the gasket 10 pressed against the bottom of the tank. A gasket 14, interposed between the bottom of the tank 5 and a flange 9' on the fitting 9, provides the required water seal around the fitting 9. At its upper end the fitting 9 is formed with a seat 15 for the conventional flush ball (not shown) which controls the discharge of water from the tank 5 into the toilet bowl 6.

The gasket 10 is of frustoconical form and recessed on its under face to receive the nut 13.

Various forms of bolt and nut combinations are employed by different manufacturers for anchoring the tank 5 to the bowl 6. For the construction herein shown three bolts 12 with nuts are used for this purpose.

The bowl 6 is formed with a rearwardly-disposed extension 16 wherein is formed the opening 11 on the perimeter of which seats the gasket 10 and from which leads a channel 17 to the interior of the bowl 6. Concentrically of the opening 11 two or more apertures 18 are formed in an extension flange 19 and through which extend the bolts 12. The heads of the bolts 12 each have a gasket 20 interposed between the bottom of the tank and the bolt head.

Water is supplied to the tank 5 through a pipe 21.

The plate or pan 7 is of a perimetrical contour closely approximating in dimensions and form the horizontal cross-sectional form of the tank 5. It is provided with a vertically-disposed flange 22 extending around the entire perimeter with the bottom or base of the plate. The front and rear longitudinal flanges 22 are inclined slightly to the plane of the bottom of the plate, as clearly shown in Fig. 2. Thus, when assembled intermediate the tank 5 and bowl 6 with the bottom of the plate 7 having a forward pitch so as to ensure drainage of the moisture collected thereon toward the forward edge of the plate 7 the front and rear flanges are disposed in vertical planes parallel to the front and rear walls of the tank 5. A drain tube 23 extends through and is anchored to an aperture in the flange 22 at the front edge of the plate 7 intermediate its ends. The discharge end of the tube is disposed over the bowl 6.

When a moisture collector embodying this invention is provided for this type of toilet, obviously it is desirable to be able to position the plate 7 so that the perimetrical flange 22 approximately alines at all points with the vertical walls of the tank 5. If for any reason the seat which has to be provided for the collector to accommodate the fitting gasket 10 were not spaced from the sides and ends of the plate 7 in conformity with the spacing of the fitting 9 from the sides and ends of the tank 5 to which the collector is to be fitted, the result might be a very unsymmetrical relationship of the contour of the plate flange 22 and the walls of the tank 5. This not only would be unsightly but render the plate 7 incapable of collecting the condensate dripping from all the walls of the tank. To ensure this alinement of contours it is necessary, therefore, to provide the plate 7 with the separate bracket 8 rather than form the openings for the fitting 9 and bolts 12 directly in the middle portion of a plate 7.

Thus the plate 7 has openings 24 and 25 formed therein of a size and position that adapts them to encompass these parts 10 and 12, whereby the tank 5 is seated on and secured to the bowl 6, and the water supply inlet 21 respectively. The opening 25 allows for an accommodation of the plate 7 to the water inlet 21 for any adjustment of the plate relative to the tank that may be required to aline the plate 7 properly with the tank 5, as above explained. A perimetrical embossment around the opening 25 deflects moisture collecting on the plate 7 in the vicinity of the water supply inlet 21.

The bracket 8 is in the nature of a plate of perimetrical form similar to that of the opening 25 in the plate 7 but sufficiently larger to provide a substantial overlap of the perimetrical portions of the bracket 8 on the plate 7.

The bracket 8 is formed with a large central opening 26 and smaller openings 27 relatively positioned so as to receive the lower end of the tank fitting 9 and the bolts 12 respectively. The perimeter of the opening 26 is flanged and provided with a tapering seat 28 adapted to accommodate the gasket 10 provided by the manufacturer of the tank and originally intended to be seated on the opening 11 in the bowl extension 16. This flange for the opening 26 extends above the plane of the bracket 8 sufficient to deflect from the opening 26 any moisture that may collect on the bracket adjacent thereto.

The openings 27 are provided to receive the tank coupling bolts 12. The perimeters of these openings are embossed so as to deflect moisture that may collect and drip from the tank in the vicinity of these bolts. The opening 27 at the rear of the bracket 8 is elongated longitudinally of the plate 7 so as to allow for a sufficient play of the bolt 12 therein to ensure the reception of all three bolts 12 in their respective openings 27 to permit the tank to be anchored to the bowl when the collector is interposed between the tank and bowl. The bracket 8 is adapted to be adjustably clamped to the plate 7 by bolts 29 which extend through right angularly-disposed slots 30 and 31 formed in the plate 7 and the bracket 8 respectively.

A supplemental gasket 32, similar to the gasket 10, and a supplemental nut 33, similar to the nut 13, provide a proper seating and seal of the coupling 9 on the opening 11 when a collector of this type has been interposed between the tank 5 and bowl 6.

The operation for positioning a moisture collector of this type between the tank 5 and bowl 6 is as follows.

With the tank 5 removed from the bowl it is turned upside down. The collector, also positioned upside down, is placed with the gasket 10 on the seat 28 and with the threaded end of the fitting 9 exposed through the opening 26 in the bracket 8. The gasket 32 is placed over the exposed end of the fitting 9 and the nut 33 screwed on to the end of the fitting 9 to clamp the gasket 32 against the bottom of the bracket 8. By loosening the nuts on the bolts 29, the plate 7 may be adjusted on the bracket 8 so as to approximately aline the perimetrical flange 22 of the plate 7 with the vertical walls of the tank 5. This being done the nuts on the bolts 29 are firmly tightened. Thereupon the tank 5, with the collector thus secured in place, is turned upright and set on the bowl with the gasket 32 seated on the perimeter of the opening 11. Bolts 12 are put in place and their nuts drawn up so that the tank is anchored to the bowl.

Variations and modifications in the details of structure and arrangement of the parts may be resorted to within the spirit and coverage of the appended claims.

I claim:

1. A moisture collector for a toilet tank of the type wherein the tank is designed to be supported directly on the bowl with a pipe fitting on the tank serving to direct the flow of water from said tank to said bowl and provided with detachable means for anchoring the tank in place on said bowl, comprising a plate of a shape approximating the horizontal cross-sectional contour of said tank, a perimetrical flange on said plate, said plate having an opening encompassing said pipe fitting and anchoring means, a second plate superimposed on said first plate with the perimeter of said second plate overlapping the perimeter of said first plate opening, said second plate having openings formed therein to receive said fitting and said anchoring means whereby said assembled plates may be interposed between said tank and bowl and secured in place by said anchoring means, and other means for adjustably securing said plates in their superimposed relationship whereby said first plate may be adjusted relative to said tank to aline said perimetrical flange with the exterior walls of said tank.

2. A moisture collector for toilets of the type wherein the tank mounts a water-outlet fitting having arranged thereon a gasket adapted to be seated on a bowl and position said fitting to direct the flow of water to said bowl, comprising a bracket provided with an opening to receive said fitting, the opening-defining portion of said bracket being formed on its upper face to seat said gasket, and a perimetrically-flanged plate contoured to approximate the horizontal cross-section of said tank adjustably mounted on said bracket, said plate having an opening to receive said fitting.

3. A moisture collector for a toilet of the type wherein the tank mounts a water-outlet fitting encompassed by a gasket seated on the bowl to support said tank in position to direct the flow of water from said tank to said bowl, the tank and bowl being also provided with detachable means for anchoring said tank to said bowl, said moisture collector comprising, a perimetrically-flanged plate of a shape approximating the horizontal cross-sectional contour of said tank and so dimensioned that the longitudinal and transverse distances between the inner faces of the respective flanges approximate the corresponding outside dimensions of said tank, said plate having an opening to receive said fitting, a bracket formed to overlay said plate contiguous to said fitting opening and itself formed with an opening to receive said fitting, the portion of the bracket bordering said opening being formed to provide a seat for said gasket, said bracket also having openings to receive said anchoring means, and coacting means on said plate and bracket for clamping them in adjusted relationship to position said plate with the inner vertical faces of the front and end flanges in approximate alinement with the outside faces of the corresponding vertical walls of said tank.

4. A moisture collector for a toilet of the type wherein the tank mounts a water-outlet fitting encompassed by a gasket seated on the bowl to support said tank in position to direct the flow of water from said tank to said bowl, the tank and bowl being also provided with detachable means for anchoring said tank to said bowl, said moisture collector comprising, a perimetrically-flanged plate of a shape approximating the horizontal cross-sectional contour of said tank and so dimensioned that the longitudinal and transverse distances between the inner faces of the respective flanges approximate the corresponding outside dimensions of said tank, said plate having an opening to receive said fitting, the plane of the upper face of the plate and that of the inner face of the flanges along the front being disposed at slightly less than at a right angle, a bracket formed to overlay said plate contiguous to said fitting opening and itself formed with an opening to receive said fitting, the portion of the bracket bordering said opening being formed to provide a seat for said gasket the axis of which gasket seat is parallel to the plane of the inner face of said plate front flange, said bracket also having openings to receive said anchoring means, and coacting means on said plate and bracket for clamping them in adjusted relationship to position said plate with the inner vertical faces of the front and end flanges in approximate alinement with the outside faces of the corresponding vertical walls of said tank.

5. A moisture collector for a toilet of the type wherein the tank mounts a water-outlet fitting encompassed by a gasket seated on the bowl to support said tank in position to direct the flow of water from said tank to said bowl, the tank and bowl being also provided with detachable means for anchoring said tank to said bowl, said moisture collector comprising, a perimetrically-flanged plate of a shape approximating the horizontal cross-sectional contour of said tank and so dimensioned that the longitudinal and transverse distances between the inner faces of the respective flanges approximate the corresponding outside dimensions of said tank, said plate having an opening to receive said fitting, a bracket formed to overlay said plate contiguous to said fitting opening and itself formed with an opening to receive said fitting, the portion of the bracket bordering said opening being formed to provide a seat for said gasket, said bracket also having openings to receive said anchoring means, said plate and bracket being formed with registering apertures in the over-lapping portions thereof with certain of said apertures being elongated, and means extending through said registering apertures for clamping said plate and bracket in adjusted relationship to position said plate with the inner vertical faces of the front and end flanges in approximate alinement with the outside faces of the corresponding vertical walls of said tank.

6. A moisture collector for use with a toilet of the coupled-tank-and-bowl type wherein the tank mounts a water-outlet fitting wherewith is associated an inverted frusto-conical gasket having an aperture extending axially inward from the larger diameter face to receive said fitting and a recess of greater diameter than said aperture extending axially inward from the opposite face for receiving a ring threaded on said fitting to clamp the radially-disposed portion of said gasket to the bottom of said tank, said gasket having its external conical surface seated on a conically-shaped rim surrounding the inlet opening for said bowl and held in place by the anchoring bolts connecting said tank and bowl, said moisture collector comprising a perimetrically-flanged member of a shape approximating the horizontal cross-sectional contour of said tank, said member having formed therein an opening with a conically-shaped rim to receive said fitting and seat the external conical surface of said gasket, a second gasket shaped substantially the same as said first-mentioned gasket, a ring substantially identical with the first-mentioned ring for screwing onto said fitting to clamp the radially-disposed portion on said second gasket to the under side of said member, said second gasket being adapted to be held with its external conical surface seated on the conically-shaped rim of said bowl inlet and held in place by said tank and bowl anchoring bolts.

STANLEY H. BUTOW.

References Cited in the file of this patent

UNITED STATES PATENTS

| Number | Name | Date |
|---|---|---|
| 849,708 | Willms | Apr. 9, 1907 |
| 2,108,625 | Tilden | Feb. 15, 1938 |
| 2,167,354 | Gavin | July 25, 1939 |
| 2,320,187 | Lawler | May 25, 1943 |
| 2,449,445 | Bodan | Sept. 14, 1948 |